Aug. 4, 1959  R. F. SCHWEGLER  2,897,904
TRACTOR MOUNTED PLOW
Filed May 15, 1954  4 Sheets-Sheet 1

INVENTOR:
ROY F. SCHWEGLER
BY: Emerson B Donnell
ATTORNEY

Aug. 4, 1959  R. F. SCHWEGLER  2,897,904
TRACTOR MOUNTED PLOW
Filed May 15, 1954  4 Sheets-Sheet 3

INVENTOR:
ROY F. SCHWEGLER
BY:
Emerson B. Donnell ATTORNEY

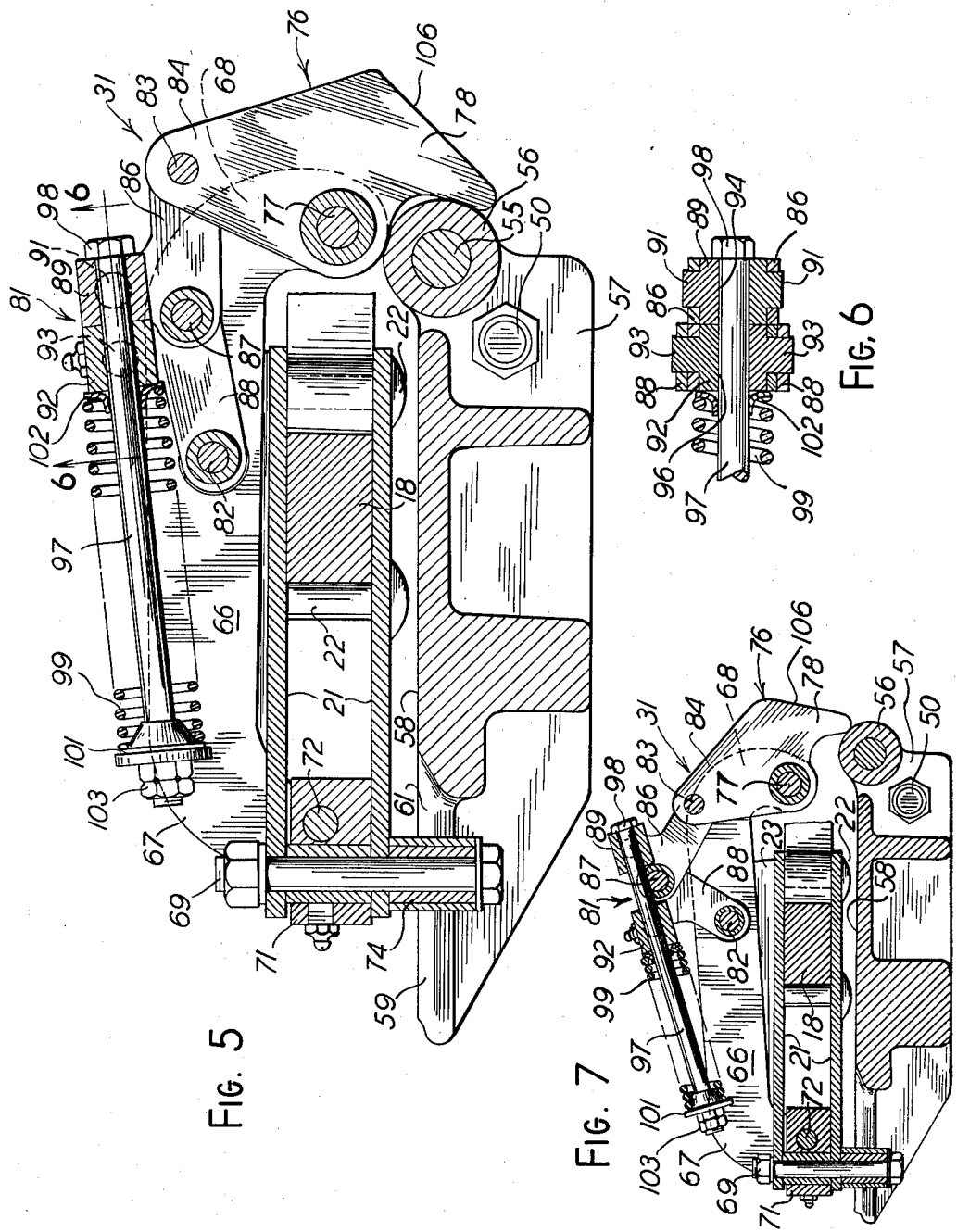
Aug. 4, 1959 — R. F. SCHWEGLER — 2,897,904
TRACTOR MOUNTED PLOW
Filed May 15, 1954 — 4 Sheets-Sheet 4
INVENTOR:
ROY F. SCHWEGLER
BY: Emerson B Donnell ATTORNEY

United States Patent Office 2,897,904
Patented Aug. 4, 1959

2,897,904

TRACTOR MOUNTED PLOW

Roy F. Schwegler, Davenport, Iowa, assignor to
J. I. Case Company, Racine, Wis.

Application March 15, 1954, Serial No. 416,285

6 Claims. (Cl. 172—269)

This invention pertains to agricultural plows, and, more particularly, it pertains to plows which are attached to tractors or other draft vehicles and which can be readily and automatically detached from said tractors.

It is a primary object of this invention to provide a plow which can be readily and automatically detached from a tractor while permitting said plow to swivel during plowing operations. Both of these functions are effected in response to the resistance met by the plow bottoms during plowing operations.

It is a further object of this invention to provide a plow which safeguards the plow and the operator during the normal course of plowing and particularly when an obstruction is met by the plow bottoms.

Other objects and advantages will become more apparent upon reading the following description in conjunction with the accompanying drawings, in which, Fig. 1 is a fragmentary side perspective view of a plow and tractor attached together and containing a preferred embodiment of this invention.

Fig. 5 is an enlarged sectional view taken on the line 5—5 of Fig. 3.

Fig. 6 is a sectional view taken on the line 6—6 of Fig. 5.

Fig. 7 is a reduced sectional view similar to that of Fig. 5 but with the operating parts in a different position.

Similar reference numerals refer to similar parts throughout the several views.

Figure 1:
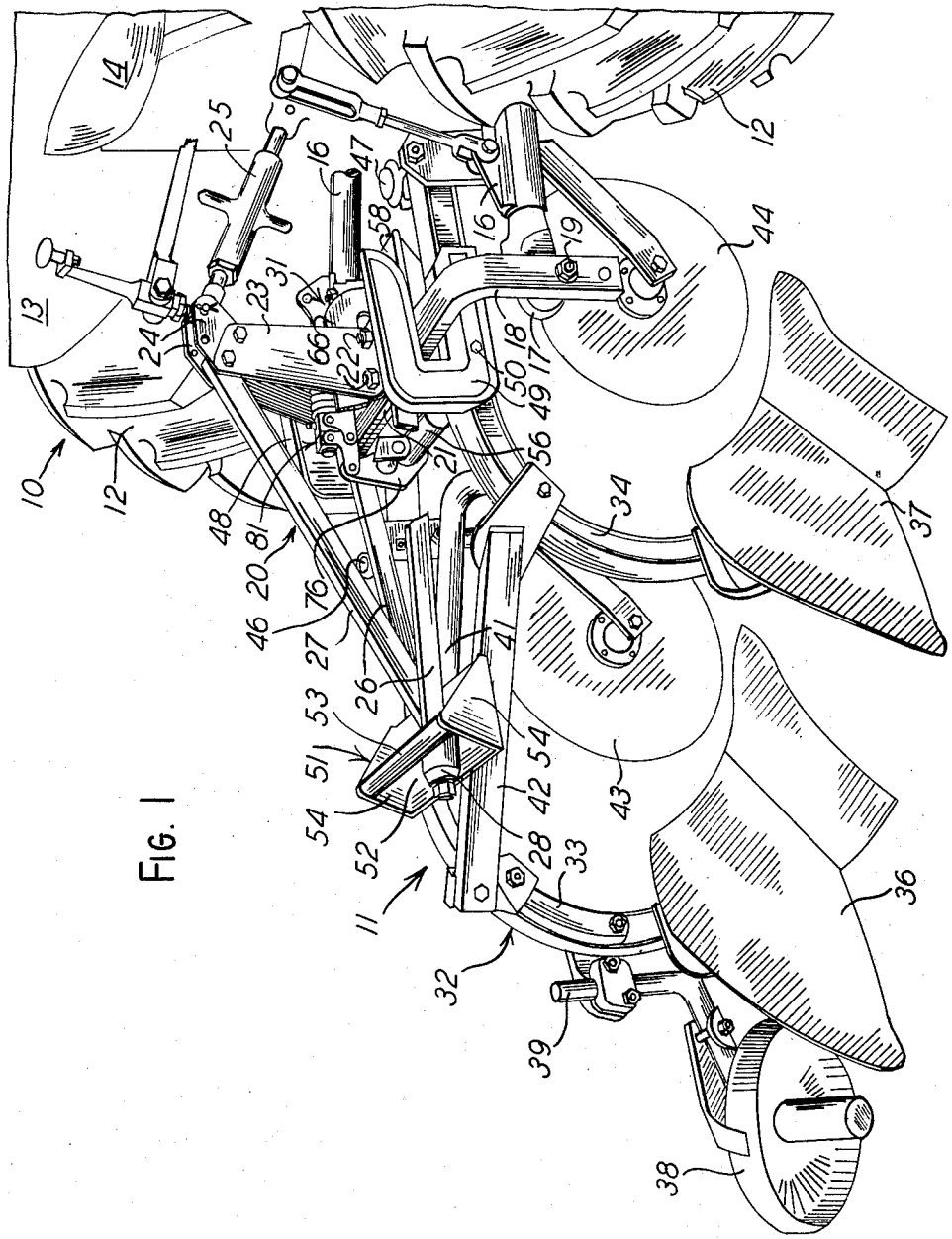
Figure 3:
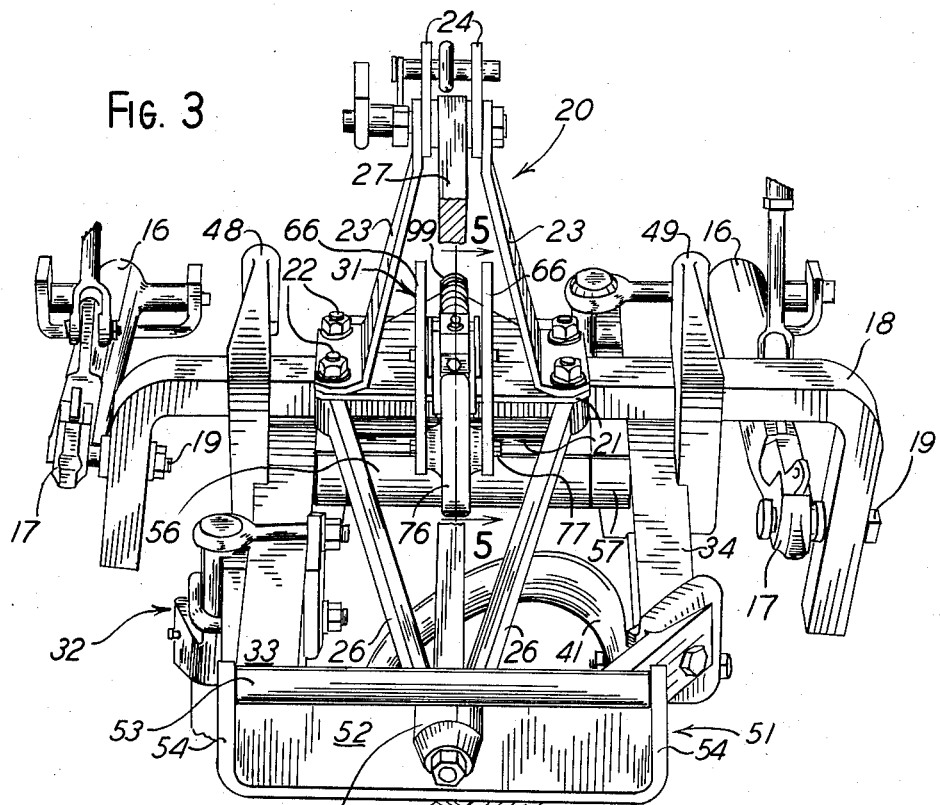
Fig. 3 is an enlarged fragmentary rear perspective view of the plow and tractor shown in Fig. 1.

Referring to Fig. 1, there is generally shown a tractor 10 with a plow 11 attached to the rear of the tractor in the usual operating position. The tractor is a conventional construction having a pair of rear wheels 12 and corresponding fenders 13 with the usual intermediately located operator's seat 14. Extending substantially horizontally from the tractor is a pair of plow hitch draft arms 16 which terminate in a latch 17 on the rear end of each arm 16. Through this construction, a bifurcated drawbar 18 is secured to the tractor by means of pins 19 hooked by each of the latches 17 to extend through the drawbar as shown. Mounted horizontally, intermediate on the drawbar 18, is a pair of clamp plates 21, one positioned on the top and one on the bottom of the drawbar as best shown in Figs. 3 and 5. The plates are secured to the drawbar by four bolts 22 which are positioned two in front and two behind the drawbar. Refer to Fig. 3.

Secured to the plates, to extend therefrom, is a mast 20. Attached beneath the nuts of the bolts 22 is a pair of oppositely disposed upright mast arms 23 which, in the embodiment shown, support a pair of rigidly attached mast plates 24 at the upper ends of the arms. An adjustable turnbuckle 25 is then preferably attached between the mast plates 24 and the tractor 10 for a purpose hereinafter described. To complete the mast construction, a pair of mast braces 26 are attached at their forward ends to the two rear bolts 22 and extend horizontally rearwardly therefrom. Also, an inclined mast brace 27 is attached between the upper ends of the arms 23 and the rearward ends of the braces 26. A horizontal roller or support shoe 28 is secured to the end of the brace 27 to control the plow in a manner explained later. The mast then serves as an extension of the tractor. With this construction, the plow is maintained level in a set position as the roller 28 governs vertical movement of the rear end of the plow.

Figure 2:
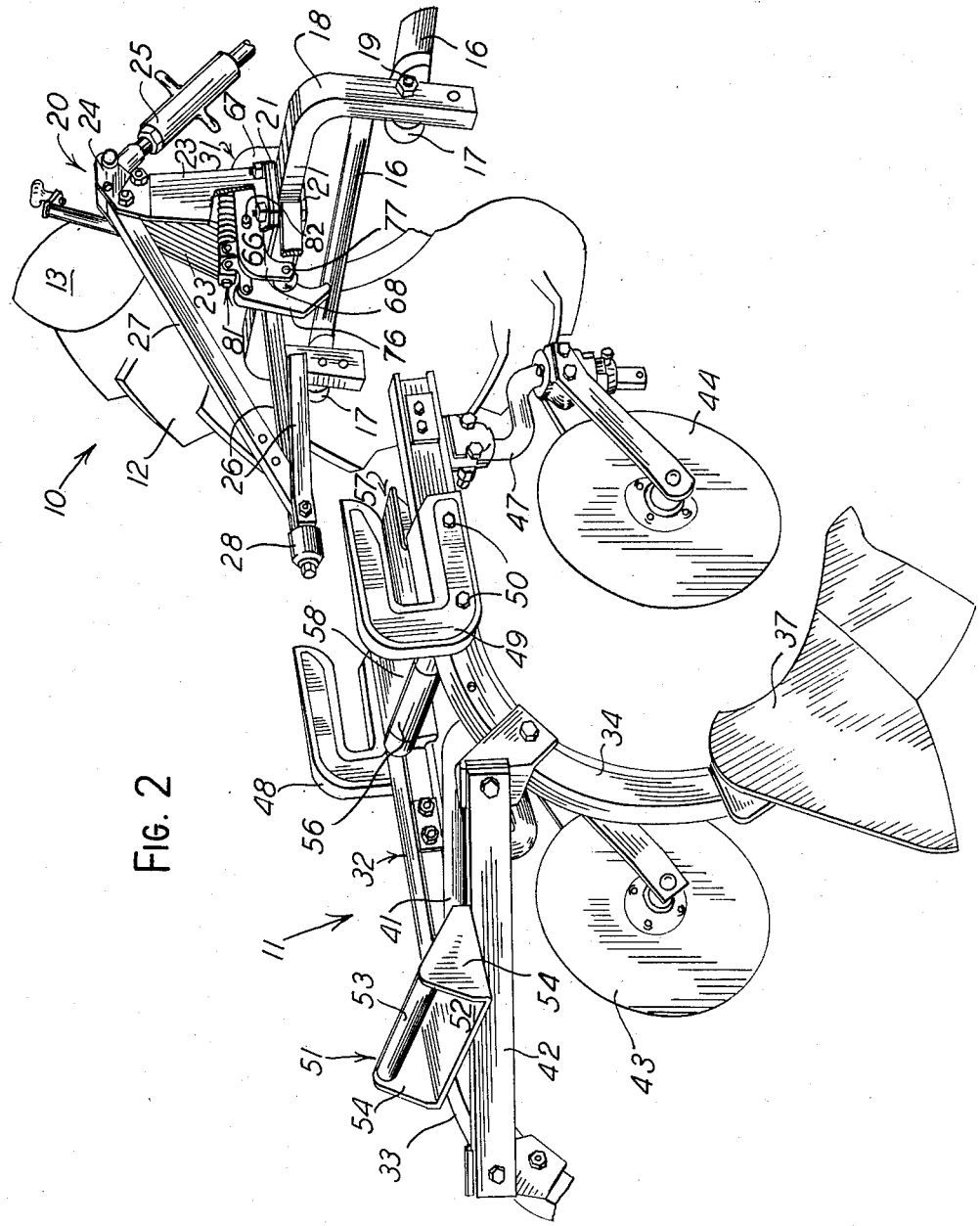
Fig. 2 is a fragmentary side perspective view of the plow and tractor shown in Fig. 1 but with the plow detached from the tractor.

The foregoing describes a tractor and a rearwardly attached draft assembly of the type more fully described in the patent to Clarke et al., 2,865,657, filed May 29, 1950 and assigned to applicant's assignee. As shown in Fig. 2, it will be noted that the draft assembly is rigidly connected to the tractor and, therefore, is not free to move relative thereto except for the movement accomplished by adjustment of the controls such as the turnbuckle 25. By shortening the length of the turnbuckle, the depth of the plowed furrow is increased, and by lengthening the turnbuckle the depth of the furrow is decreased, as more fully described in the above mentioned Clarke patent.

At this time it should be noted that there is preferably provided a hook-like draft connector assembly 31, as shown in Fig. 2, to be mounted with the draft assembly attached to the tractor 10 and located between the mast arms 23. The assembly 31 provides the only draft connection between the described tractor parts and the plow 11. The details of the assembly 31 will be explained later.

The plow 11 comprises a frame 32 having a pair of spaced apart side beams 33 and 34 which are horizontally disposed parallel to each other and each has a downwardly curved rearward end. The beam 34 is shorter than the beam 33. Plow bottoms 36 and 37 are respectively suitably attached to the bottom ends of the beams 33 and 34. Also, attached on the beam 33 at the extreme rear of the plow is a rotatable furrow wheel 38 which is positioned at a slight incline with respect to the vertical plane of the plow. An axle 39 is attached to the beam 33 at an upper end of the axle while the lower end thereof serves to mount the wheel 38 as shown. With this arrangement, it will be understood that the lateral thrust, effected during plowing by the plow bottoms 36 and 37, will be neutralized by the furrow wheel 38 which rides in the furrow to brace the plow.

To complete the plow frame structure, there is preferably provided a beam brace 41 which is positioned between the beams 33 and 34 to secure the plow frame together. Also, a frame side brace 42 is preferably bolted between the curved ends of the beams 33 and 34. Attached separately to the beams 33 and 34 is a pair of coulters 43 and 44 mounted to depend on arms 46 and 47, respectively. The arms are suitably attached to the beams to depend therefrom as shown.

Referring to the top of the beams 33 and 34, there is provided a pair of hooks 48 and 49 which are respectively mounted on the beams by bolts 50. As seen in Fig. 1, the hooks serve to guide the drawbar 18 primarily in a vertical direction and thus maintain the plow in substantially a level horizontal position with respect to the position of the tractor. Also attached to the rear top of the plow 11 is a guide or plate 51 having a horizontally disposed base 52 and an upper bar 53 which is also horizontal but vertically spaced from the base 52. A pair of oppositely spaced apart vertical sides 54 is a part of the guide 51 and they serve to support the bar 53, as shown. The guide is preferably bolted to the beam 33 and the brace 42 in a suitable manner to extend transverse to the length of the plow across the rear end thereof for a purpose hereinafter described.

Figure 4:
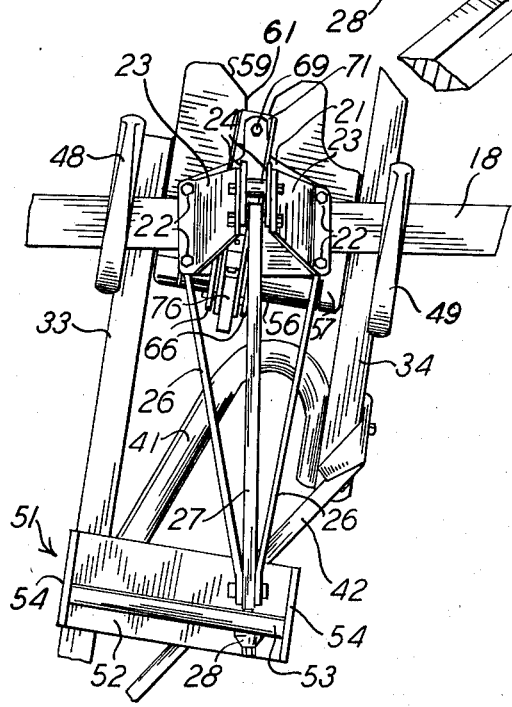
Fig. 4 is a reduced plan view of a part of that shown in Fig. 3 but with the plow swiveled to one side with respect to the tractor.

As shown in Figs. 2 and 5, a latch roller or connector retainer 56 is rotatably mounted horizontally between the beams 33 and 34 intermediate the hooks 48 and 49. The actual mounting for the roller is provided by a shaft 55 which extends between bearings of a cross member 57 which is secured between the beams 33 and 34 by the bolts 50 and has a horizontal flat top surface 58. As shown in Fig. 5, the top of the roller projects above the level of the surface 58 for a purpose hereinafter described. The member 57 is further provided with a V-shaped slot 59 located centrally in the front end of the member as shown in Fig. 4. Rearward of the slot 59 is a rectangular slot 61 forming a continuation of the slot 59.

Again referring to the draft connector assembly 31, it will be noted that the assembly comprises a pair of vertically positioned and spaced apart bifurcated plates or yokes 66. As shown in Figs. 2 and 5, the plates have front and rear depending ends 67 and 68, respectively. The front ends 67 are pivotally attached to the drawbar 18 through the clamp plates 21 which secure a bolt 69 in the front ends of the plates in a vertical position as shown in Fig. 5. The bolt 69 carries a block 71 in the space between the plates 21, and the block 71 contains a horizontal pivot pin 72 which extends beyond the sides of the block to pivotally secure the plates 66.

The lower end of the bolt 69 preferably carries a sleeve 74. The sleeve is arranged to permit it to project into the slots 59 and 61 for a later described reason.

Pivotally mounted on the rear ends of the plates 66 is a latch lip or connector 76 attached by a transversely extending pivot pin 77. A lower end 78 of the latch 76 is curved or hooked to engage an under surface of the roller 56 as shown in Fig. 5. While the latch 76 remains in this position, it provides the only draft connection between the tractor 10 and the plow 11.

Also mounted on the plates 66 is a toggle assembly 81 which is pivotally mounted between a pin 82, extending transversely between the plates 66, and a pin 83 which is transversely mounted in an upper end 84 of the latch 76. Pivotally mounted on the pin 83 is a pair of toggle links 86 which extend therefrom to pivotally connect through a pin 87 with a second pair of toggle links 88 which are pivotally mounted on the pin 82. In the latched position, as shown in Fig. 5, it should be noted that the pin 87 is positioned above the line between the centers of the pins 82 and 83. Thus, any movement of the pin 83 toward pin 82 will cause the pin 87 to be positioned further above the center line, as the pin 82 is a fixed pin.

The links 86 are provided with upwardly extending ends which receive a bearing block 89 by having openings in the links through which project a pair of oppositely disposed trunnions 91. The trunnions are formed integral with the block 89 as shown in Fig. 6. Also, the upper ends of the links 88 receive a bearing block 92 which is provided with a pair of trunnions 93, all similar to the arrangement described above. The blocks are then pivotally related to the links.

The blocks 89 and 92 contain aligned holes 94 and 96, respectively, which are transverse to the axis of the trunnions. These holes then receive a bolt 97 whose head 98 abuts the end of the block 89 while the opposite end of the bolt extends from the blocks to carry a compression spring 99. To this end the bolt 97 is provided with oppositely disposed bearing plates 101 and 102 secured respectively on the extended end of the bolt and also on the bolt adjacent the block 92. Also, nuts 103 are adjustably positioned on the end of the bolt 97 to be movable axially therealong and thereby vary the compression of the spring. It should be obvious that the amount of pre-loading of the spring 99 will affect the operation of the toggle assembly 81.

With this construction, a force in excess of a predetermined amount will cause the latch 76 to pivot counterclockwise as viewed in Fig. 5. This action causes the pin 83 to move toward pin 82 and consequently causes pin 87 to move upwardly. Thus, the blocks 89 and 92 move apart against the compression of the spring 99. In this manner, the spring loaded toggle assembly is operating against the force tending to unlock the latch from its draft connection with the plow. If a sufficient unlocking force is applied, the latch will pivot to a position where its lower end 78, which is in contact with the roller 56, moves to the upper part of the roller, at which time the entire toggle assembly pivots upwardly about the pin 72. The latch is then free of the roller and the plow is detached from the tractor. See Fig. 7.

In reconnecting the plow and the tractor, the tractor is backed up to the plow to align the pivot sleeve 74 with the slot 59. The tractor is backed further until the sleeve passes into the slot 61. During this movement the inclined rear edge 106 of the latch 76 first engages the surface 58, slides along said surface, pivoting the entire draft connector assembly 31 upwardly about pivot 72, and then encounters the forward top surface of the roller 56 and slides over the top of the roller, again pivoting the draft connector or toggle assembly upwardly about the pin 72. The tractor continues to more backward until the latch 76 fully clears the roller at which time the entire toggle assembly falls into a horizontal position. In this position, the latch is beyond or rearwardly of the roller 56 and the latch, which has now dropped freely to a level where it is locked with the roller, draft connects the tractor and the plow when the tractor pulls the toggle assembly forward.

An important feature of this invention is the provision for the plow to swivel with respect to the tractor permitting the plow to follow the curves of contour farming. Thus, as shown in Fig. 4, the plow is swiveled or pivoted about the bolt 69, as the tractor bears to the left, and the plow thus follows or "tracks" in the contoured path of the tractor. In this position the latch 76 positions itself axially along the roller 56 and the roller 28 moves on the surface 52 of the guide 51. In this manner the plow is free to swivel to the lateral extent limited by the allowable movement of the rear mast braces, and the roller 28 between the sides 54 of the guide. It will be noted that the rear mast braces form a cantilever extended from the tractor. The resistance of the ground on the plow bottoms causes the plow to swivel automatically as the tractor turns, and in addition to this is the feature of the automatic detachment of the plow from the tractor when the resistance met by the plow bottoms exceeds a predetermined amount established by the adjustment of the toggle spring.

While a specific embodiment of this invention has been shown and described, the scope of this invention should be limited only by the appended claims.

I claim:

1. In a plow of the type attached to a draft vehicle, the combination comprising a spring biased latch pivotally attached to the rear of said vehicle and adapted to release in response to a predetermined force, a plow frame, a latch engaging surface on said plow frame, said vehicle and said plow frame being arranged for said latch to yieldingly lock onto said latch engaging surface whereby said predetermined force therebetween will actuate said spring biased latch and thereby effect an unlocking of said plow from said draft vehicle, said draft vehicle and said plow frame having a common pivot axis about which said plow can swing laterally with respect to said vehicle, said pivot axis being spaced rearwardly of said vehicle and maintained during operation in fixed relation thereto.

2. A tractor conveyed pivotal plow comprising in combination a draft connector horizontally and vertically pivotally attached to the rear of said tractor, a draft connector retainer transverse on said plow to engage said draft connector when said plow is attached to said tractor whereby said connector pivots horizontally to adjustably engage said retainer in response to the pivot of said plow, spring biased means associated with said draft connector to urge said connector into vertical pivotal movement in response to a predetermined force on said plow tending to detach said plow from said tractor, a guide mounted on said plow, and a cantilever attached to the said tractor to extend longitudinally rearwardly therefrom to engage said guide with the rear end thereof to permit limited transverse movement between said plow and said cantilever rear end.

3. In a tractor mounted plow a laterally rigid rearwardly directed structure on the tractor including a pair of laterally spaced apart laterally rigid arms and a cross bar connected with the rear ends of said arms, vertically and horizontally disposed pivot means on said cross bar, means providing a forwardly open guiding slot on the plow engaged with said cross bar for guiding side to side swinging movements of said plow relatively to said tractor, a hook-like draft connector pivoted on said pivot means, extending rearwardly and having a transversely extending latch lip, an engaging portion on said plow spaced from said pivot means and engaged with said latch lip for receiving draft from said draft connector whereby said draft connector can swing with said plow as said plow swings about said pivot means, and said latch lip being pivoted on said draft connector, yieldable means retaining the latch lip in engagement with said plow engaging portion but capable of yielding when subjected to abnormal loads to provide for swinging of said lip toward a position in line with said draft connector so as to release said engaging portion, and accordingly said plow from said tractor and cross bar, and said lip having a surface inclined in relation to said engaging portion and positioned to encounter the same when said tractor is backing into coupling relation with said plow for deflecting said hook-like draft connector for passage to the rear of, and subsequent engagement with said engaging portion for draft connection of said tractor to said plow.

4. In a tractor mounted plow a laterally rigid rearwardly directed structure on the tractor including a pair of laterally spaced apart laterally rigid arms and a cross bar connected wtih the rear ends of said arms, vertically disposed pivot means on said cross bar, means providing a forwardly open guiding slot on the plow engaged with said cross bar, said plow being swingable from side to side and guided in such swinging movement by engagement of said slot with said cross bar, a hook-like draft connector horizontally pivoted relative to said pivot means, extending rearwardly and having a downwardly extending latch lip, an engaging portion on said plow spaced from said pivot means and engaged with said latch lip for receiving draft from said draft connector whereby said draft connector can swing from side to side with said plow as said plow swings about said pivot means, and said latch lip being pivoted on said draft connector, yieldable means retaining, the latch lip in engagement with said plow engaging portion but capable of yielding when subjected to abnormal loads to provide for swinging of said lip toward a position in line with said draft connector so as to release said engaging portion, and accordingly said plow from said tractor and cross bar, and said lip having a surface inclined in relation to said engaging portion and positioned to encounter the same when said tractor is backing into coupling relation with said plow for deflecting said hook-like draft connector upwardly for passage to the rear of, and subsequent engagement with said engaging portion for draft connection of said tractor to said plow.

5. In a tractor mounted plow a laterally rigid rearwardly directed structure on the tractor including a pair of laterally spaced apart laterally rigid arms and a cross bar connected with the rear ends of said arms, vertically disposed pivot means on said cross bar, means providing a forwardly open guiding slot on the plow engaged with said cross bar for guiding side to side swinging movements of said plow relatively to said tractor, a hook-like draft connector pivoted on said pivot means, extending rearwardly and having a transversely extending latch lip, an engaging portion on said plow spaced from said pivot means and engaged with said latch lip for receiving draft from said draft connector whereby said draft connector can swing with said plow as said plow swings about said pivot means, and said latch lip being pivoted on said draft connector, yieldable means retaining the latch lip in engagement with said plow engaging portion but capable of yielding when subjected to abnormal loads to provide for swinging of said lip toward a position in line with said draft connector so as to release said engaging portion, and accordingly said plow from said tractor and cross bar.

6. In a tractor mounted plow a laterally rigid rearwardly directed structure on the tractor including a pair of laterally spaced apart laterally rigid arms and a cross bar connected with the rear ends of said arms, vertically disposed pivot means on said cross bar, means providing a forwardly open guiding slot on the plow engaged with said cross bar for guiding side to side swinging movements of said plow relatively to said tractor, a hook-like draft connector pivoted on said pivot means, extending rearwardly and having a transversely extending latch lip, an engaging portion on said plow spaced from said pivot means and engaged with said latch lip for receiving draft from said draft connector whereby said draft connector can swing with said plow as said plow swings about said pivot means, said pivot being adjustable along said cross bar laterally of said tractor, and said latch lip being pivoted on said draft connector, yieldable means retaining the latch lip in engagement with said plow engaging portion in position transverse to said draft connector but capable of yielding when subjected to abnormal loads to provide for swinging of said lip toward a position in line with said draft connector so as to release said engaging portion, and accordingly said plow from said tractor and cross bar.

References Cited in the file of this patent

UNITED STATES PATENTS

| 1,299,351 | Johnson | Apr. 1, 1919 |
| 2,430,696 | Acton | Nov. 11, 1947 |
| 2,456,693 | Fraga | Dec. 21, 1948 |
| 2,602,389 | Markel | July 8, 1952 |
| 2,618,211 | Fraga | Nov. 18, 1952 |
| 2,701,510 | Altegelt | Feb. 8, 1955 |
| 2,782,704 | Jackson | Feb. 26, 1957 |

FOREIGN PATENTS

| 1,025,436 | France | Jan. 21, 1953 |